United States Patent
Stanifer et al.

(10) Patent No.: US 10,336,146 B2
(45) Date of Patent: Jul. 2, 2019

(54) REMOVABLE SECURING CHAIN ATTACHMENT ASSEMBLY

(71) Applicant: Cequent Performance Products, Inc., Plymouth, MI (US)

(72) Inventors: Eric J. Stanifer, Mishawaka, IN (US); Richard W. McCoy, Granger, IN (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 126 days.

(21) Appl. No.: 15/429,273

(22) Filed: Feb. 10, 2017

(65) Prior Publication Data

US 2017/0151844 A1    Jun. 1, 2017

Related U.S. Application Data

(63) Continuation of application No. 14/567,539, filed on Dec. 11, 2014, which is a continuation of application No. 13/660,903, filed on Oct. 25, 2012.

(60) Provisional application No. 61/628,135, filed on Oct. 25, 2011.

(51) Int. Cl.
  *B60D 1/18*    (2006.01)
  *B60D 1/52*    (2006.01)

(52) U.S. Cl.
  CPC .............. *B60D 1/187* (2013.01); *B60D 1/182* (2013.01); *B60D 1/52* (2013.01)

(58) Field of Classification Search
  CPC .............. B60D 1/52; B60D 1/82; B60D 1/187
  USPC ...................................................... 280/432
  See application file for complete search history.

(56) References Cited

U.S. PATENT DOCUMENTS

| | | |
|---|---|---|
| 1,958,723 A | 5/1934 | Spencer |
| 1,996,162 A | 4/1935 | Lubbers |
| 2,027,990 A | 1/1936 | Lubbers |
| 2,041,124 A | 5/1936 | Francis |
| 2,289,079 A | 7/1942 | Seyferth |
| 2,507,616 A | 5/1950 | Stephen |
| 2,513,117 A | 6/1950 | Stephen |
| 2,543,749 A | 3/1951 | Walther |
| 2,610,069 A | 9/1952 | Ketel |
| 2,621,056 A | 12/1952 | Kayler |
| 2,680,627 A | 6/1954 | Johnson et al. |

(Continued)

FOREIGN PATENT DOCUMENTS

| | | |
|---|---|---|
| DE | 2121876 | 4/1971 |
| EP | 0038928 B1 | 4/1981 |

(Continued)

OTHER PUBLICATIONS

International Search Report for International App. No. PCT/US2011/063922 dated May 8, 2012.

*Primary Examiner* — Kevin Hurley
*Assistant Examiner* — Felicia L. Brittman
(74) *Attorney, Agent, or Firm* — McDonald Hopkins LLC

(57) ABSTRACT

A securing chain attachment assembly is shown and described. The securing chain attachment assembly may include an attachment body selectively and rotatably securable to a towing vehicle, the attachment body rotatable along a first plane. The securing chain attachment assembly may also include a securement member attached to the attachment body, the securement member capable of having selectively secured thereto a securement chain, where the chain attachment member is pivotal along a second plane, the second plane generally parallel to the first plane.

13 Claims, 11 Drawing Sheets

(56) References Cited

U.S. PATENT DOCUMENTS

| | | | |
|---|---|---|---|
| 2,749,144 A | 6/1956 | Kayler | |
| 2,778,657 A | 1/1957 | Chaplin | |
| 2,779,605 A | 1/1957 | Braunberger | |
| 2,799,516 A | 7/1957 | Greenway | |
| 2,809,851 A | 10/1957 | Beck | |
| 2,819,096 A | 1/1958 | Sencenich | |
| 2,856,203 A | 10/1958 | Kayler | |
| 2,860,891 A | 11/1958 | Ramun | |
| 2,900,194 A | 8/1959 | De Lay | |
| 2,925,286 A | 2/1960 | Hodges, Jr. et al. | |
| 2,960,741 A * | 11/1960 | Bruno | F16B 21/165 24/607 |
| 2,962,245 A | 11/1960 | Molzan et al. | |
| 2,977,137 A | 3/1961 | Durham | |
| 2,985,463 A | 5/1961 | Geerds | |
| 3,073,624 A | 1/1963 | Thomas | |
| 3,106,377 A | 10/1963 | Cotton | |
| 3,112,936 A | 12/1963 | Cole et al. | |
| 3,170,716 A | 2/1965 | Walther et al. | |
| 3,171,672 A | 3/1965 | Dalton | |
| 3,198,549 A | 8/1965 | Martin | |
| 3,220,750 A | 11/1965 | Mead | |
| 3,252,681 A | 5/1966 | Watts | |
| 3,272,061 A | 9/1966 | Clifford et al. | |
| 3,318,616 A | 5/1967 | Fontaine et al. | |
| 3,367,000 A | 2/1968 | Schluter | |
| 3,402,944 A | 9/1968 | Day | |
| 3,584,899 A | 6/1971 | Gottler et al. | |
| 3,595,125 A | 7/1971 | Jacobs | |
| 3,606,384 A | 9/1971 | Fontaine et al. | |
| 3,630,545 A | 12/1971 | Fontaine et al. | |
| 3,640,549 A | 2/1972 | Neff et al. | |
| 3,739,432 A | 6/1973 | Sander et al. | |
| 3,746,369 A | 7/1973 | Neff et al. | |
| 3,816,882 A | 6/1974 | Maeda et al. | |
| 3,844,584 A | 10/1974 | Fontaine | |
| 3,847,414 A | 11/1974 | Madura | |
| 3,861,709 A | 1/1975 | Mulcahy et al. | |
| 3,888,514 A | 6/1975 | Klein | |
| 3,893,710 A | 7/1975 | Madura | |
| 3,941,407 A | 3/1976 | Breford | |
| 4,017,095 A | 4/1977 | Best | |
| 4,029,335 A | 6/1977 | Cady et al. | |
| 4,039,087 A | 8/1977 | Sandvick, Sr. | |
| 4,091,744 A | 5/1978 | Crissy et al. | |
| 4,134,601 A | 1/1979 | Propst | |
| 4,201,400 A * | 5/1980 | Hoogenbosch | B60D 1/52 280/511 |
| 4,429,892 A | 2/1984 | Frampton et al. | |
| 4,457,650 A | 7/1984 | Tseng | |
| 4,477,100 A | 10/1984 | Elyakim | |
| 4,505,344 A | 3/1985 | Hobbs et al. | |
| 4,531,774 A | 7/1985 | Whatley | |
| 4,614,355 A | 9/1986 | Koch | |
| 4,630,982 A | 12/1986 | Fenner | |
| 4,721,323 A | 1/1988 | Czuk et al. | |
| 4,856,804 A | 8/1989 | Nash | |
| 4,892,324 A | 1/1990 | Spencer et al. | |
| 4,921,266 A | 5/1990 | Beals | |
| 4,928,987 A | 5/1990 | Hunger | |
| 4,946,183 A | 8/1990 | Benson et al. | |
| 4,960,288 A | 10/1990 | Chambers | |
| 4,962,945 A | 10/1990 | Vannoy et al. | |
| 5,044,651 A | 9/1991 | Weikel | |
| 5,120,080 A | 6/1992 | Ritter | |
| 5,141,277 A | 8/1992 | Alexander | |
| 5,246,244 A | 9/1993 | Colibert | |
| 5,265,992 A | 11/1993 | Jensen | |
| 5,306,037 A | 4/1994 | Robertson | |
| D362,224 S | 9/1995 | McCoy et al. | |
| 5,449,191 A | 9/1995 | Cattau | |
| 5,509,682 A | 4/1996 | Lindenman et al. | |
| 5,516,137 A | 5/1996 | Kass et al. | |
| 5,529,329 A | 6/1996 | McCoy | |
| 5,571,270 A | 11/1996 | Larkin et al. | |
| D376,751 S | 12/1996 | Hanson et al. | |
| 5,580,073 A | 12/1996 | Irwin et al. | |
| D378,077 S | 2/1997 | Lindenman et al. | |
| 5,707,070 A | 1/1998 | Lindenman et al. | |
| 5,738,363 A | 4/1998 | Larkin | |
| 5,738,471 A | 4/1998 | Zentner et al. | |
| 5,772,229 A | 6/1998 | Cattau | |
| 5,839,745 A | 11/1998 | Cattau et al. | |
| 5,893,575 A | 4/1999 | Larkin | |
| 5,971,418 A | 10/1999 | Lindenman et al. | |
| 6,065,766 A | 5/2000 | Pulliam | |
| 6,170,850 B1 | 1/2001 | Works | |
| 6,179,316 B1 | 1/2001 | Sibley, Jr. | |
| 6,193,261 B1 | 2/2001 | Hanka | |
| 6,199,889 B1 | 3/2001 | Golembiewski et al. | |
| 6,422,795 B2 | 7/2002 | Holt et al. | |
| 6,467,791 B1 | 10/2002 | Fandrich et al. | |
| 6,502,846 B2 | 1/2003 | Fandrich et al. | |
| 6,520,528 B2 | 2/2003 | Fandrich et al. | |
| 6,523,841 B2 | 2/2003 | Glaser | |
| 6,533,308 B1 | 3/2003 | Tambornino | |
| 6,695,338 B1 | 2/2004 | Roberts | |
| 6,758,921 B1 | 7/2004 | Struebel | |
| 6,783,144 B2 | 8/2004 | McCoy et al. | |
| 6,824,157 B1 | 11/2004 | Putnam | |
| 6,851,695 B2 | 2/2005 | Lindenman et al. | |
| 6,918,721 B2 | 7/2005 | Venton et al. | |
| 6,969,090 B1 | 11/2005 | Works et al. | |
| 6,983,950 B2 | 1/2006 | McCoy et al. | |
| 7,121,573 B2 | 10/2006 | Lindenman et al. | |
| 7,264,259 B2 | 9/2007 | Lindenman et al. | |
| 7,413,390 B1 | 8/2008 | Allison et al. | |
| 7,472,919 B2 | 1/2009 | Pratt et al. | |
| 7,654,027 B1 * | 2/2010 | Grover | F16B 21/165 24/573.11 |
| 7,775,541 B2 | 8/2010 | Linger et al. | |
| 7,793,968 B1 | 9/2010 | Withers | |
| 7,828,317 B2 | 11/2010 | Withers et al. | |
| 7,988,176 B2 | 8/2011 | Colibert et al. | |
| 8,011,685 B2 | 9/2011 | Belinky et al. | |
| 8,056,862 B1 * | 11/2011 | Tomerlin | B64G 1/58 244/159.1 |
| 8,215,658 B2 | 7/2012 | Stanifer et al. | |
| 8,360,458 B2 | 1/2013 | Stanifer et al. | |
| 8,414,009 B2 | 4/2013 | Stanifer et al. | |
| 9,067,468 B2 | 6/2015 | Stanifer et al. | |
| 2003/0015855 A1 | 1/2003 | McCoy et al. | |
| 2003/0034633 A1 | 2/2003 | Belinky | |
| 2003/0038452 A1 | 2/2003 | Lindenman et al. | |
| 2003/0209878 A1 | 11/2003 | Lindenman et al. | |
| 2003/0209879 A1 | 11/2003 | Lindenman et al. | |
| 2005/0104326 A1 * | 5/2005 | Hord | B60D 1/06 280/511 |
| 2005/0146116 A1 * | 7/2005 | Lindenman | B62D 53/08 280/433 |
| 2006/0163840 A1 | 7/2006 | Schwalbe | |
| 2008/0315557 A1 | 12/2008 | Stanifer et al. | |
| 2009/0295122 A1 | 12/2009 | Withers et al. | |
| 2010/0109285 A1 | 5/2010 | Stanifer et al. | |
| 2013/0127137 A1 | 5/2013 | McCoy et al. | |
| 2013/0193671 A1 | 8/2013 | McCoy | |
| 2013/0307248 A1 | 11/2013 | Stanifer et al. | |
| 2015/0090847 A1 | 4/2015 | McCoy | |
| 2015/0273962 A1 | 10/2015 | Stanifer et al. | |

FOREIGN PATENT DOCUMENTS

| | | |
|---|---|---|
| EP | 1078785 A2 | 2/2001 |
| EP | 1036679 B1 | 8/2004 |
| WO | WO2009030026 A1 | 3/2009 |

* cited by examiner

REMOVABLE SECURING CHAIN ATTACHMENT ASSEMBLY

CROSS-REFERENCE TO RELATED APPLICATION

This application is a continuation of U.S. patent application Ser. No. 14/567,539 entitled "Removable Securing Chain Attachment Assembly," filed on Dec. 11, 2014, which is a continuation of U.S. patent application Ser. No. 13/660,903 entitled "Removable Securing Chain Attachment Assembly" filed on Oct. 25, 2012, now abandoned, which claims the benefit from U.S. Provisional Patent Application No. 61/628,135 entitled "Removable Securing Chain Attachment Assembly" filed on Oct. 25, 2011, all of which are hereby incorporated in their entirety by reference.

FIELD OF INVENTION

The present invention generally relates to an attachment assembly for a towing vehicle and, more particularly, to a removable securing chain attachment assembly to selectively attach a securing chain to a towing vehicle.

BACKGROUND

It is well known in the art to utilize a trailer hitch to connect a trailer to a towing vehicle. There are many different types of trailer hitches known in the art that may be attached to the towing vehicle in a variety of ways. Some of the most common types of hitches include gooseneck, fifth wheel, rear mount, and the like. Typically, trailers are connected to a towing vehicle by way of a hitch ball secured to the vehicle and a ball socket coupling mechanism on the trailer that mounts over the hitch ball and thereby allows for the trailer to pivot behind the towing vehicle.

The hitch ball of some hitches, such as goosenecks, for example, is commonly mounted in the load bed of a pickup truck in proximity to the longitudinal centerline of the load bed and generally above the rear axle. The weight of the trailer, therefore, may be generally distributed between the tires on the sides of the towing vehicle. This type of hitch may often be secured to the towing vehicle structure in an opening cut in the bed of the truck so that a substantial portion of the hitch attachment is located below the load bed of the towing vehicle. In addition, the hitch ball typically may be removable or retractable to a stowed position to ensure that the use of the load bed is not substantially hindered by the presence of the hitch ball.

It is well known in the art, to utilize securing chains with the towed vehicle, gooseneck hitch to which it attaches and the towing vehicle. Securing chains may used to provide a secondary means of connection between the rear of the towing vehicle and the front of the trailer or towed vehicle in case of separation. The securing chain may remain connected to the towing and towed vehicles during operation. Further, the securing chain may assist in maintaining the appropriate spacing between the towing vehicle and towed vehicle during operation.

The securing chains may be secured between the trailer and an anchor within the towing vehicle. The attachment assemblies for the securing chains often prevent or otherwise inhibit full use of the load bed of the towing vehicle. Further, the securing chains may cause the securing chain attachment assemblies to which the securing chain attaches to have significant forces applied during operation. These forces may be applied in multiple directions depending on several operational factors. Further, prior art attachment assemblies or securing chains may scrape the towing vehicle, such as the bed on which the gooseneck hitch is attached causing damage thereto.

Therefore, there is a need for a securing chain attachment assembly that does not substantially obstruct the bed of the truck when the hitch is not being used. There is also a need to provide a removable securing chain attachment assembly. Further, there is a need for a securing chain attachment assembly that is able to withstand the multitude of forces applied thereto during operation. Still further, there is a need for a securing chain attachment assembly that may be operable without resulting in damage to the towing vehicle to which it is attached.

SUMMARY

A securing chain attachment assembly is shown and described. The securing chain attachment assembly may include an attachment body selectively and rotatably securable to a towing vehicle, the attachment body rotatable along a first plane. The securing chain attachment assembly may also include a securement member attached to the attachment body, the securement member capable of having selectively secured thereto a securement chain, where the chain attachment member is pivotal along a second plane, the second plane generally parallel to the first plane.

A securing chain attachment assembly may include an attachment body having an insert portion capable of selective attachment to a receiver of an under bed gooseneck hitch, where the insert portion is rotatable with respect to the attachment body along a first plane, and an elongated securement member pivotally secured with the attachment body along a second plane, the second plane generally perpendicular to the first plane. The securing chain attachment assembly may also include a gate attached to the securement member, the gate selectively positionable in a first direction providing access to attach a securing chain to the securement member.

A securing chain attachment assembly may include an attachment body having an insert portion capable of selective attachment to a receiver of gooseneck hitch attached below a load bed of a towing vehicle. The securing chain attachment assembly may also include a securement member attached with the attachment body, where the securement member is positionable relative to the load bed of the towing vehicle along at least first and second planes.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
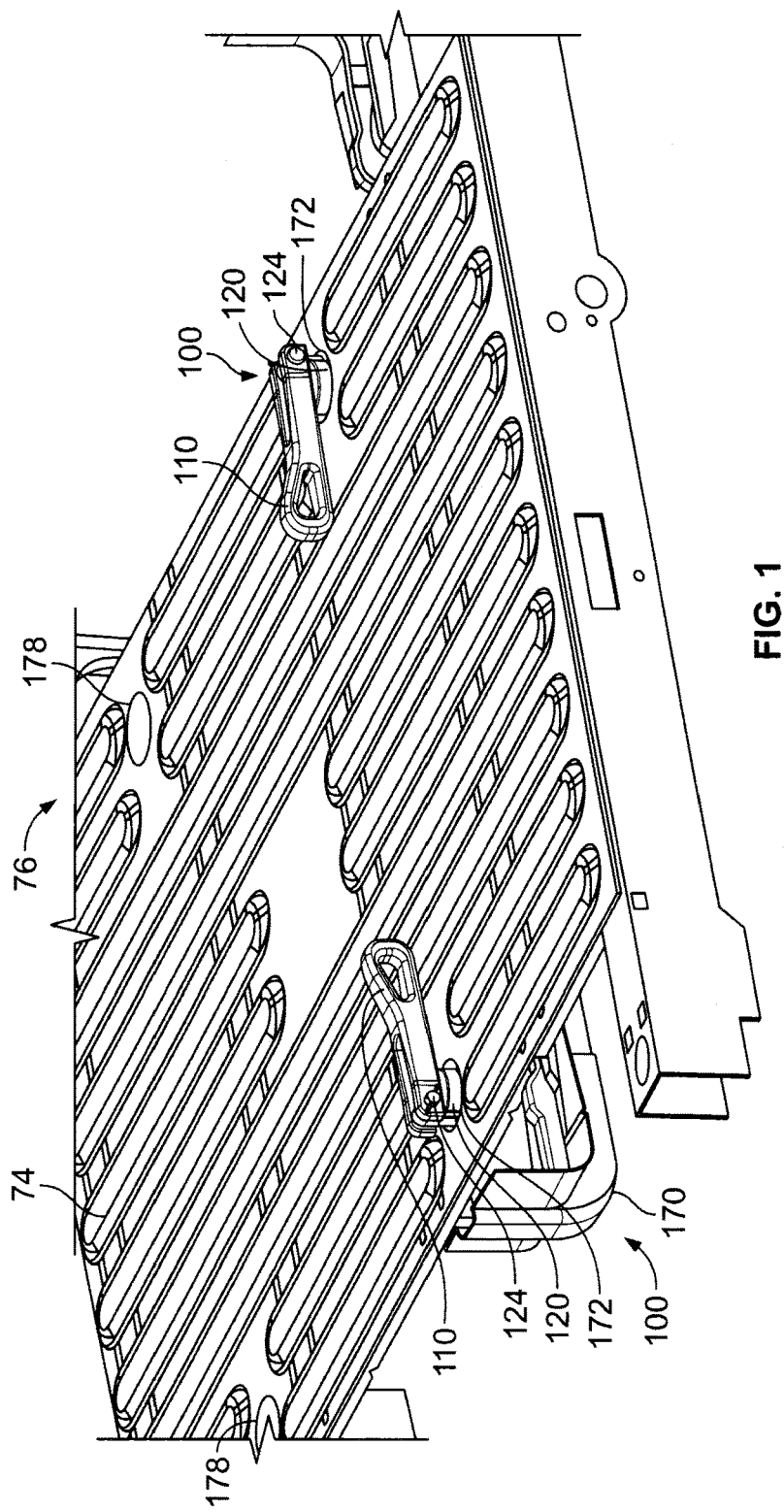
FIG. 1 is a perspective view of a pair of embodiments of a removable securing chain attachment assembly secured to a load bed of a towing vehicle.

A removable securing chain attachment assembly 100 is shown in FIGS. 1-7. As shown in FIG. 1, a pair of removable securing chain attachment assemblies 100 may be selectively secured in a load bed 74 of a towing vehicle 76. The present teachings are not limited to any specific number of securing chain attachment assemblies 100 being selectively attached to the towing vehicle 76. Any number of removably chain attachment assemblies 100 may be used, such as by way of a non-limiting example, one, two, three, four, etc. Further, while a single removable securing chain attachment assembly 100 is described below, if more than one removable securing chain attachment assembly is utilized any appropriate embodiment of the removably chain attachment assembly may be used, including, without limitation utilizing removable securing chain attachment assemblies that are of differing construction.

The removable securing chain attachment assembly 100 may include a chain attachment arm 110 and a receiver attachment body 120 attached to the chain attachment arm 110. The chain attachment arm 110 may be pivotally attached to the receiver attachment body 120 in any appropriate manner. By way of a non-limiting example the chain attachment arm 110 may be pivotally attached to the receiver attachment body 120 at a pivot 124. This may allow the chain attachment arm 110 to generally pivot any appropriate amount at the pivot 124.

The chain attachment arm 110 may be of any appropriate shape and size, such as by way of a non-limiting example, being of a generally elongated shape. The chain attachment arm 110 may be of any appropriate material, such as by way of a non-limiting example, steel, stainless steel, aluminum, or the like. In some embodiments, the chain attachment arm 110 may generally be of a cast or forged metal, such as steel or any other appropriate material.

The chain attachment arm 110 may include a chain attaching portion 130 extending therefrom. The chain attaching portion 130 may be monolithically formed or attached through any appropriate process. The chain attaching portion 130 may be of any appropriate shape and size such that a securing chain (not shown) may be selectively attached in any appropriate manner to the chain attaching portion 130. By way of a non-limiting example, the chain attaching portion 130 may be a generally closed loop of any appropriate shape, such as shown in FIGS. 1-7. Alternatively, the chain attaching portion 130 may have a generally open loop, hook or slot shaped to selectively attach thereto the securing chain (not shown).

The chain attachment arm 110 may include a pair of arms 134 that extend distally from the chain attaching portion 130. The arms 134 may be of any appropriate shape and size, such as by way of a non-limiting example, being generally elongated arms as shown. The arms 134 may extend a predetermined distance from one another as they extend from the chain attaching portion 130. The arms 134 may be integrally formed as a monolithic unit with the chain attaching portion 130 or may be attached thereto through a subsequent operation. Further, each of the arms 134 may include apertures 140. The apertures 140 may be of any appropriate shape and size. The apertures 140 of each arm 134 may be generally aligned with one another.

The receiver attachment body 120 may include an insert body 144 of any appropriate configuration. The receiver attachment body 120 may also include a load bed engaging portion 146 attached with the insert body 144 in any appropriate manner, such as being formed as a monolithic unit, welding, fastening, or the like. A generally cylindrical sleeve 148 may be attached to at least one of the load bed engaging portion 146 and the insert body 144. However, in some embodiments, the receiver attachment body 120 may not include the load bed engaging portion 146.

The sleeve 148 may be attached to the at least one of the load bed engaging portion 146 and the insert body 144 in any appropriate manner. The sleeve 148 may be fastened, welded, adhered using adhesives, integrally formed with the load bed engaging portion 146, or the like. The sleeve 148 may also be fastened, welded, adhered using adhesives, integrally formed with the insert body 144, or the like. The sleeve 148 may include a generally hollow portion (not shown). The sleeve 148 may be of a length L that it generally fits between the arms 134 of the chain attachment arm 110, which may form a portion of the pivot 124.

The pivot 124 may include a pin 154 inserted through the apertures 140 of the arms 134 and through the sleeve 148. The pin 154 may include a head 156 sized and shaped to engage one of the arms 134 and to prevent passing through the aperture 140. The pin 154 may include an aperture 158 that may be transversely spaced from the head 156. The aperture 156 may be shaped and sized to accept a cotter pin 160 selectively securing the pin 154 in the apertures 140 and the hollow portion 150 of the sleeve 148. The pin 154 may be of a configuration to permit the chain attachment arm 110 to pivot relative to the receiver attachment body 120 along the pivot 124.

The receiver attachment body 120 may be capable of being selectively attached to an under bed gooseneck hitch mounting system 170. The under bed gooseneck hitch mounting system 170 may be any appropriate under bed mounting system that may have selectively attached thereto a gooseneck hitch (not shown). By way of a non-limiting example, the under bed gooseneck hitch mounting system 170 may be that shown and described in U.S. Patent Application Serial Number 20100109285, which is hereby incorporated by reference. The under bed hitch mounting system 170 may include at least one receiver 172. The receiver 172 may be below a load bed 74 of the towing vehicle 76. By way of a non-limiting example, the receiver 172 may be located immediately below an aperture 178 in the load bed 74 of the towing vehicle 76. The receiver 172 may be of any appropriate shape and size. The receiver 172 may be a puck mounting system that may allow the under bed gooseneck hitch mounting system 170 to be installed in the load bed 74 of the towing vehicle 76 with only four small apertures 178. Utilizing the puck mounting system may provide uninhibited use of the load bed 74 of the towing vehicle 76 truck bed when removable securing chain attachment assembly 100 is dismounted.

The removable securing chain attachment assembly 100 may take advantage of an under bed mounting system designed for the various types of hitches. These types of hitches may mount on top of an under bed rail mounting system where the hitch ball may either be removed or folded down for easy access. For example, removable securing chain attachment assembly 100 may allow users that have an existing rail kit to use the receivers 72 for safety chain hook ups on gooseneck trailers.

The load bed engaging portion 146 may be of any appropriate shape such that when the receiver attachment body 120 is selectively secured to the receiver 172, the load bed engaging portion 146 may be generally in close proximity to the load bed 74 of the towing vehicle 76. This may result in the removable securing chain attachment assembly 100 being aesthetically pleasing when selectively attached to the towing vehicle 76. By way of a non-limiting example, the load bed engaging portion 146 may be of a generally cylindrical shape such as the generally "puck" shape shown. The load bed engaging portion 146 may extend slightly above or below the load bed 74 or may be generally planar with the load bed 74. The load bed engaging portion 146 may generally rest on the receiver 172.

Figure 2:
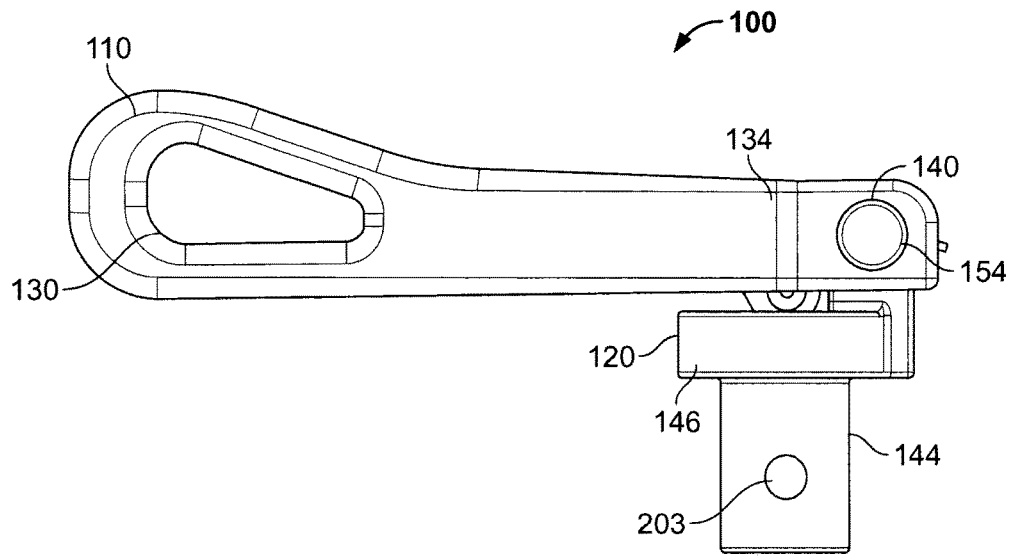
FIG. 2 is an elevation view of the removable securing chain attachment assembly of FIG. 1.
Figure 3:
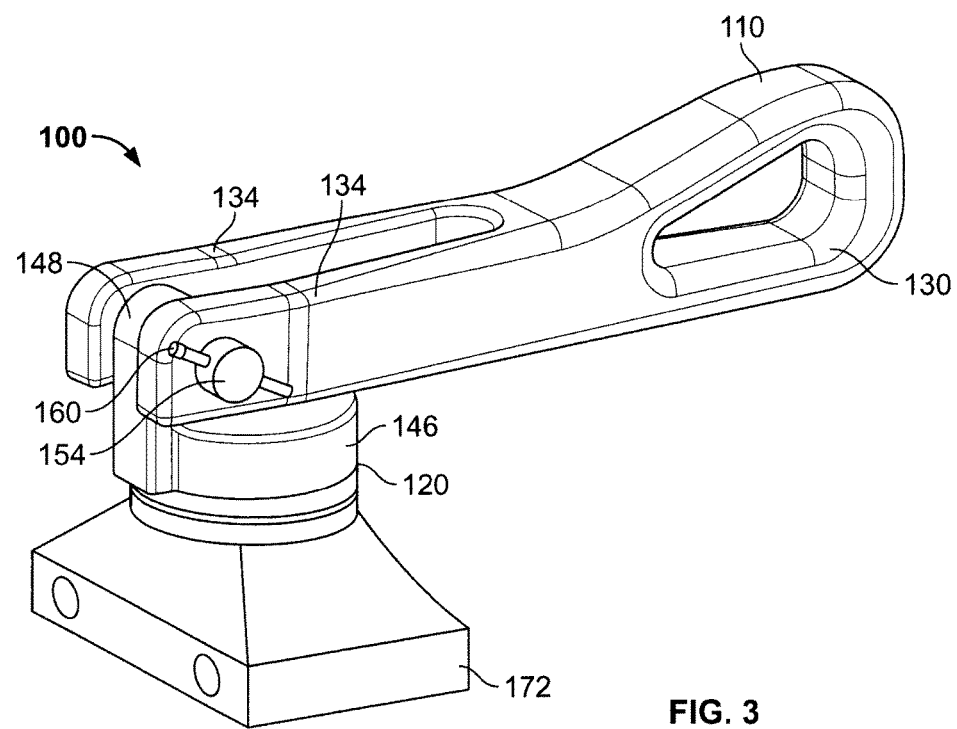
FIG. 3 is a perspective view of the removable securing chain attachment assembly of FIG. 1.
Figure 4:
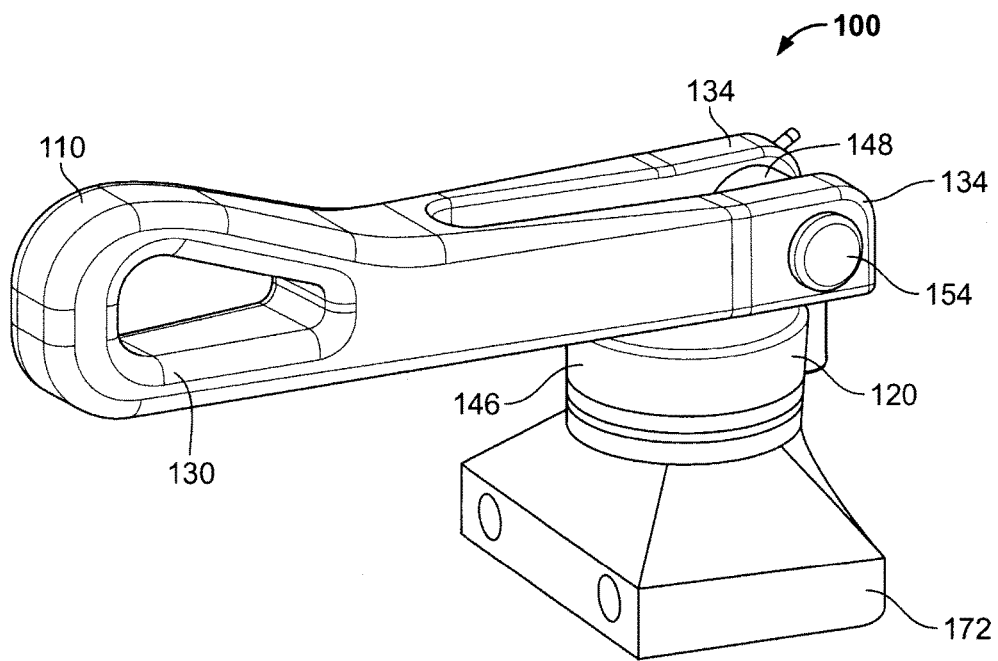
FIG. 4 is a perspective view of the removable securing chain attachment assembly of FIG. 1.
Figure 5:
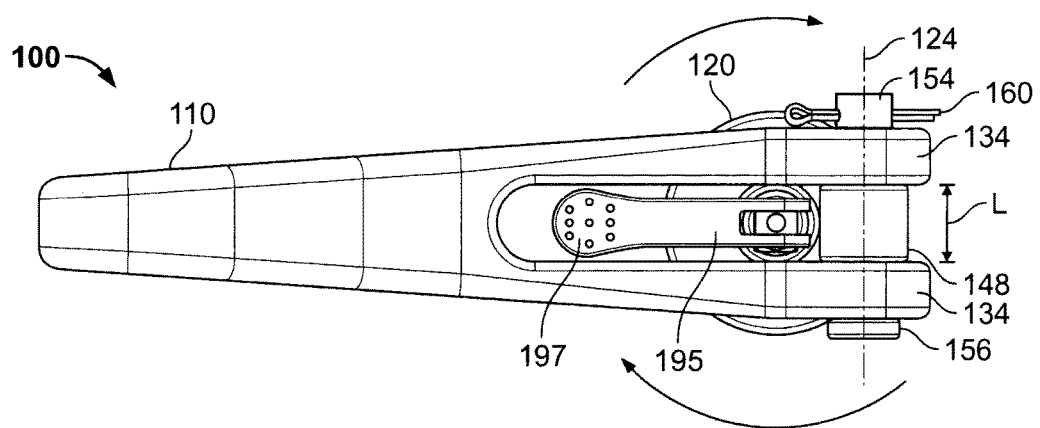
FIG. 5 is a plan view of the removable securing chain attachment assembly of FIG. 1.
Figure 6:
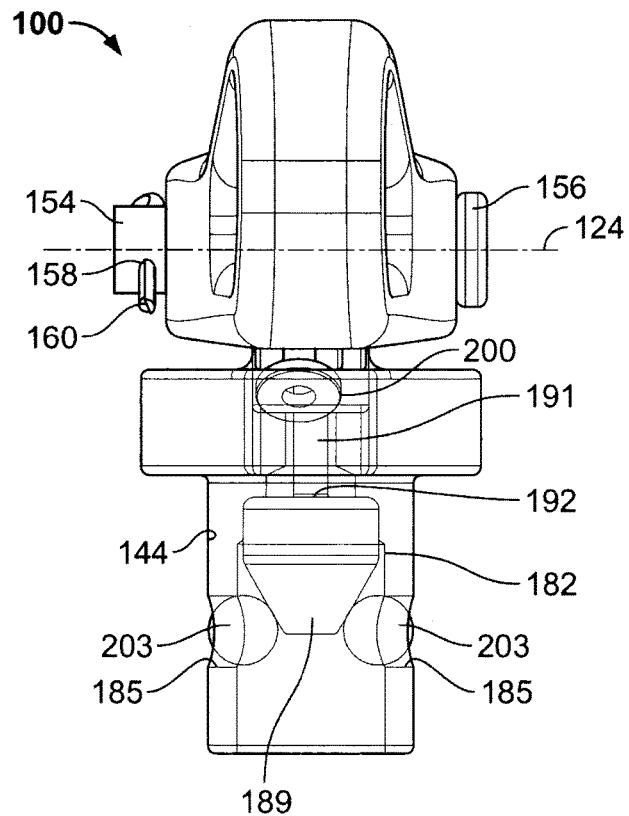
FIG. 6 is an end view of the removable securing chain attachment assembly in an unlocked position with a receiver attachment body in phantom of FIG. 1.
Figure 7:
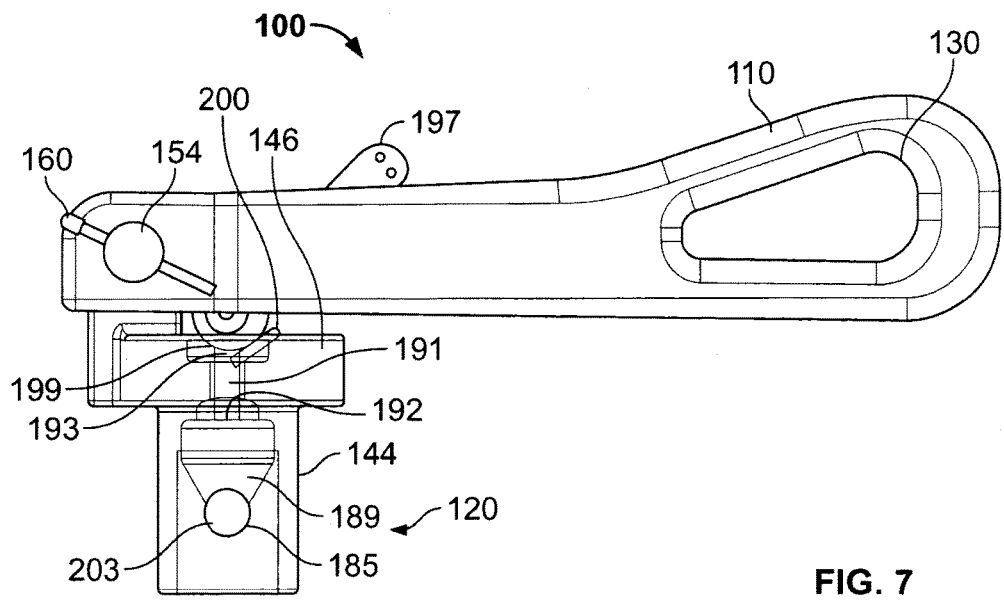
FIG. 7 is a side view of the removable securing chain attachment assembly in an unlocked position with the receiver attachment body in phantom of FIG. 1.
Figure 8:
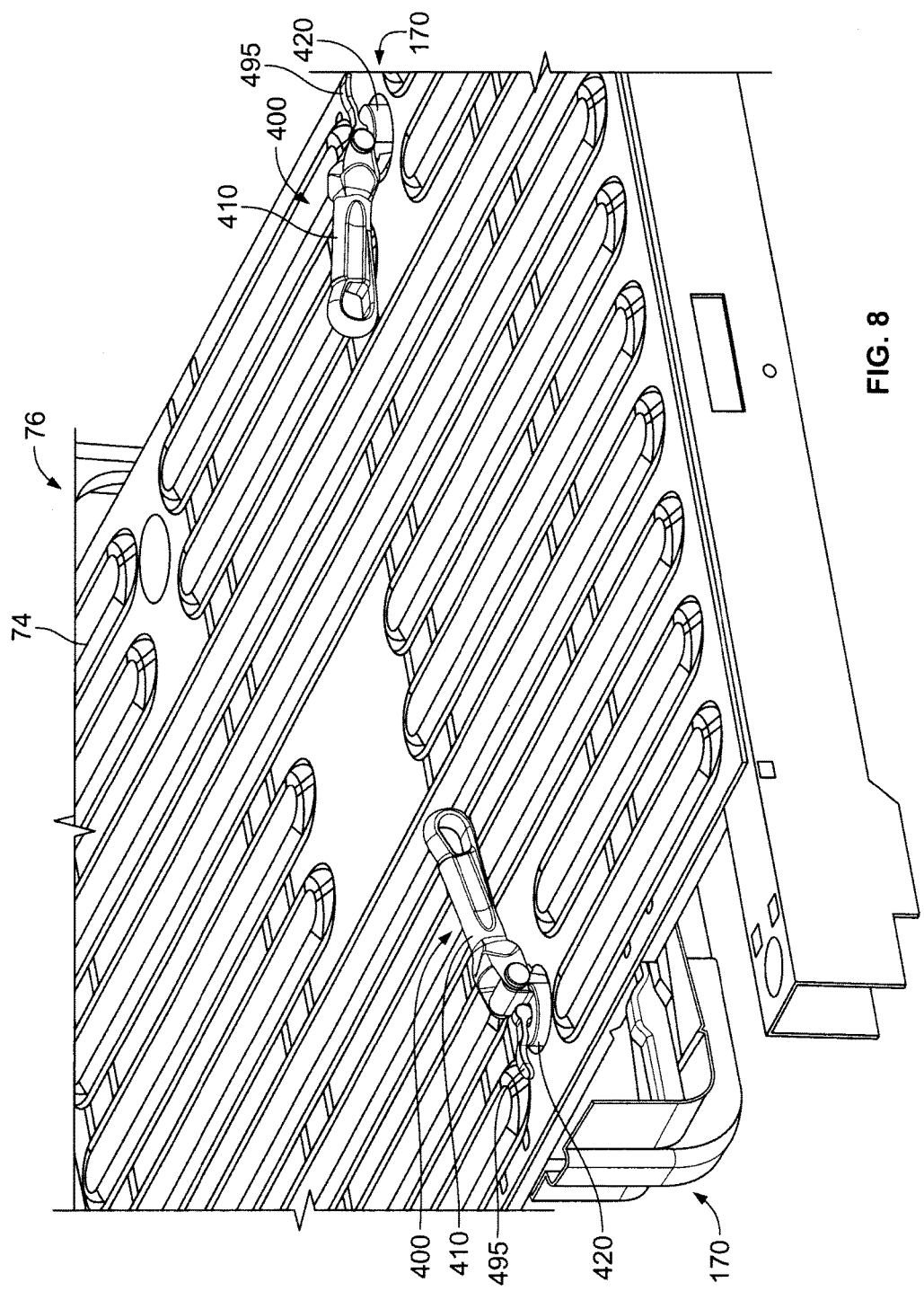
FIG. 8 is a perspective view of a pair of embodiments of a removable securing chain attachment assembly secured to a load bed of a towing vehicle.
Figure 9:
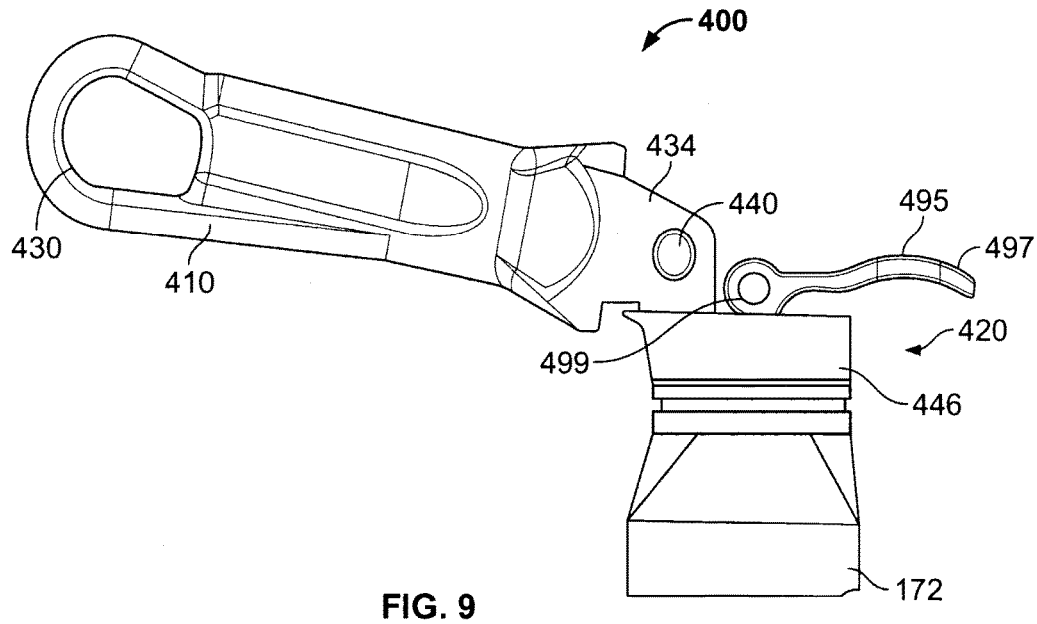
FIG. 9 is an elevation view of the removable securing chain attachment assembly of FIG. 8.
Figure 10:
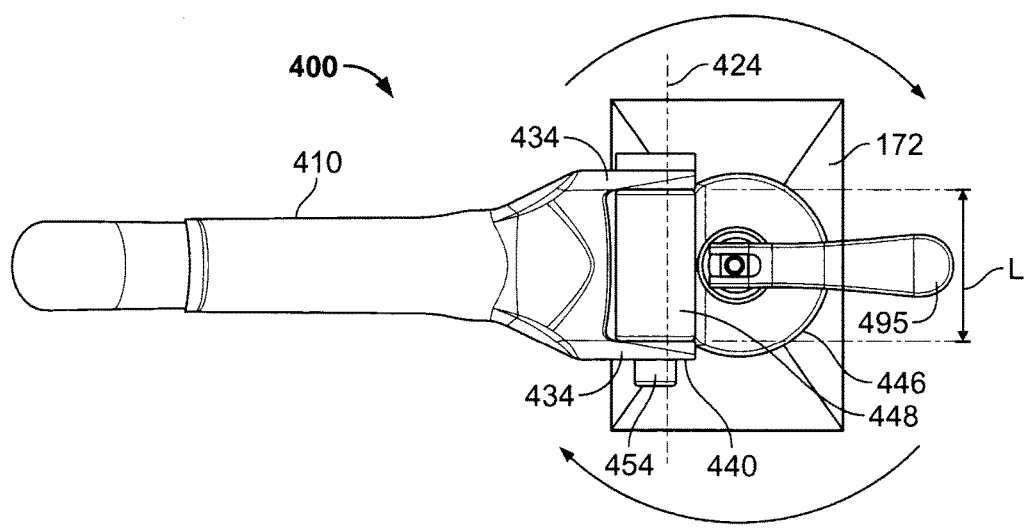
FIG. 10 is a plan view of the removable securing chain attachment assembly of FIG. 8.
Figure 11:
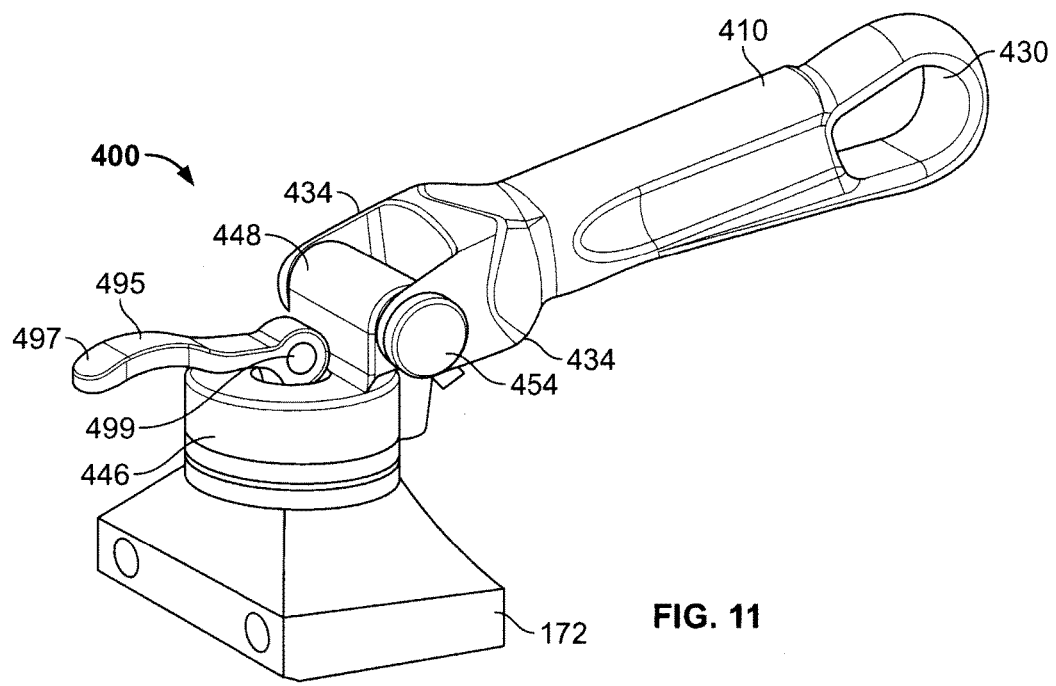
FIG. 11 is a perspective view of the removable securing chain attachment assembly of FIG. 8.
Figure 12:
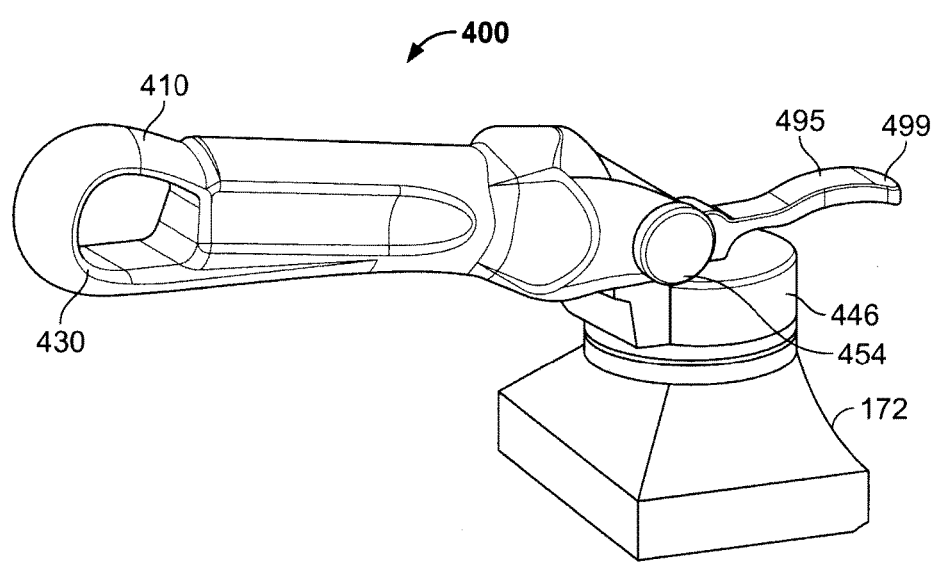
FIG. 12 is a perspective view of the removable securing chain attachment assembly of FIG. 8.
Figure 13:
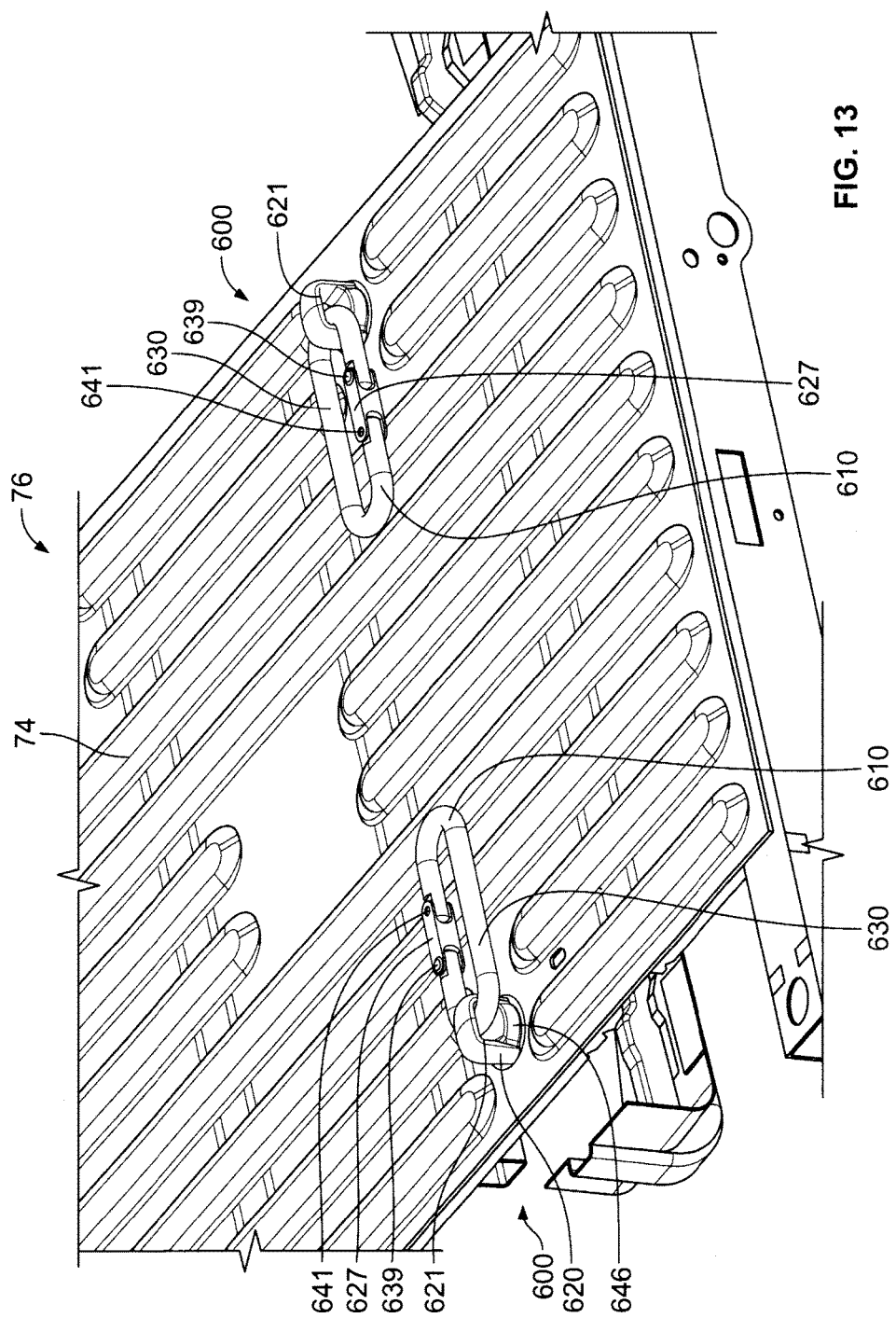
FIG. 13 is a perspective view of a pair of embodiments of a removable securing chain attachment assembly secured to a load bed of a towing vehicle.
Figure 14:
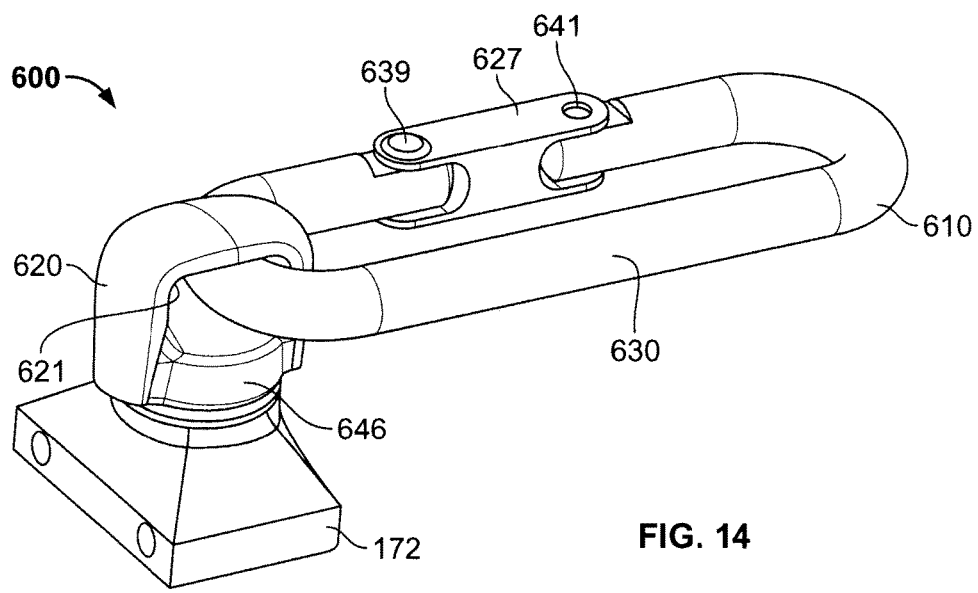
FIG. 14 is a perspective view of the removable securing chain attachment assembly of FIG. 13.
Figure 15:
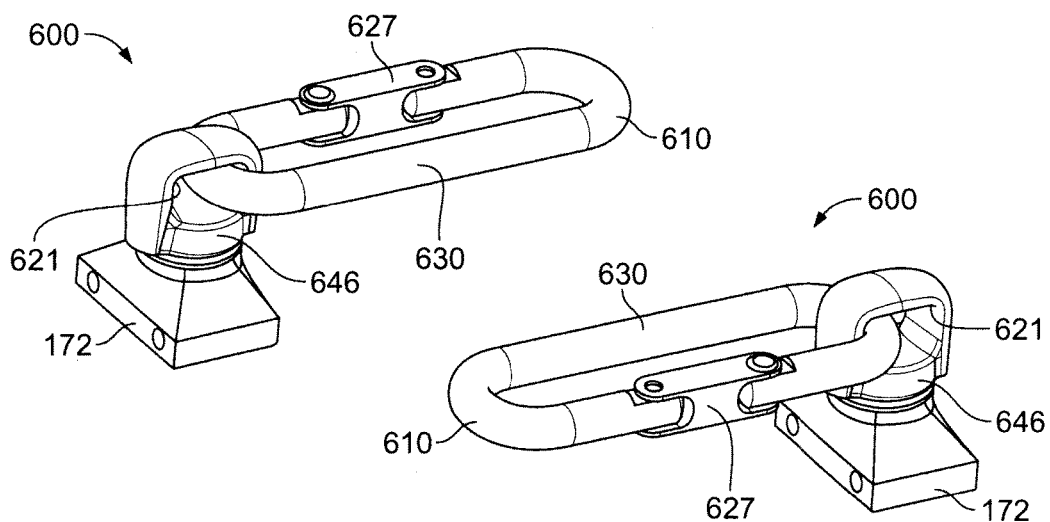
FIG. 15 is a perspective view of the pair of the removable securing chain attachment assembly of FIG. 13.
Figure 16:
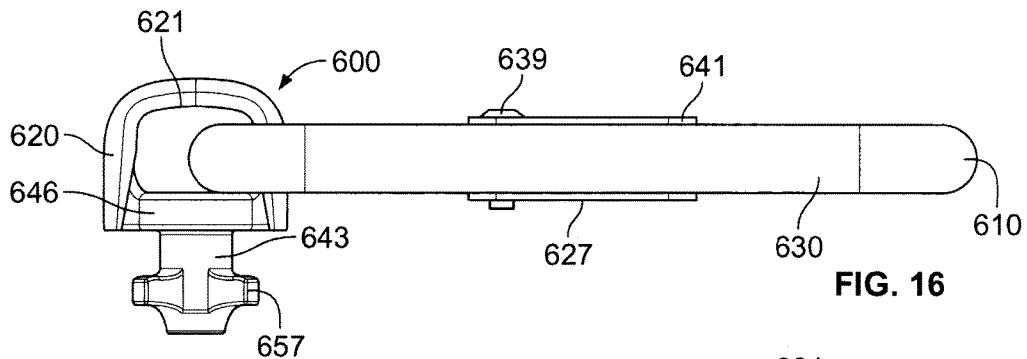
FIG. 16 is a first side view of the removable securing chain attachment assembly of FIG. 13.
Figure 17:
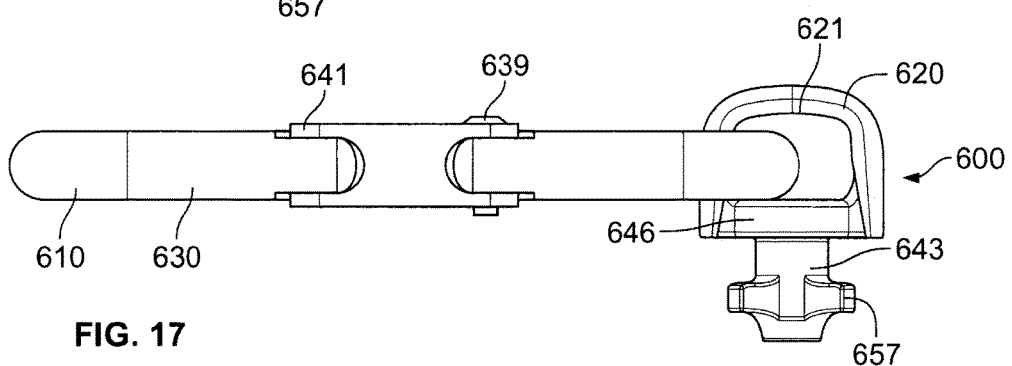
FIG. 17 is a second side view of the removable securing chain attachment assembly of FIG. 13.
Figure 18:
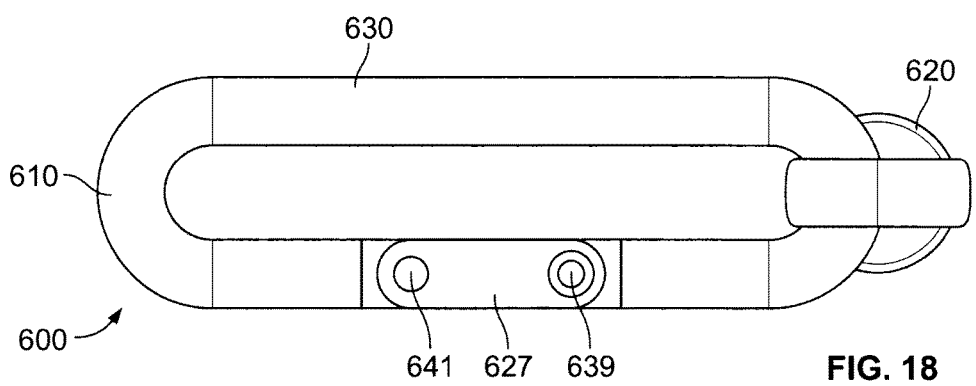
FIG. 18 is an elevation view of the removable securing chain attachment assembly of FIG. 13.
Figure 19:
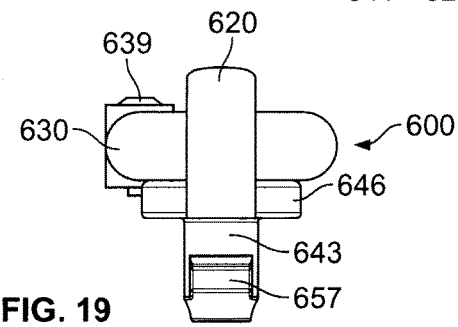
FIG. 19 is an end view of the removable securing chain attachment assembly of FIG. 13.
Figure 20:
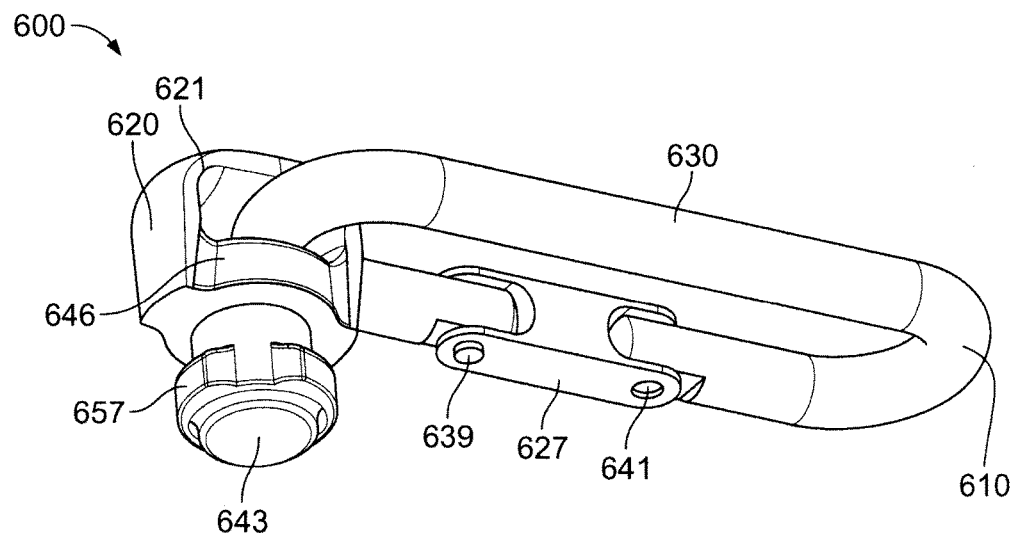
FIG. 20 is a perspective view of the removable securing chain attachment assembly of FIG. 13.
Figure 21:
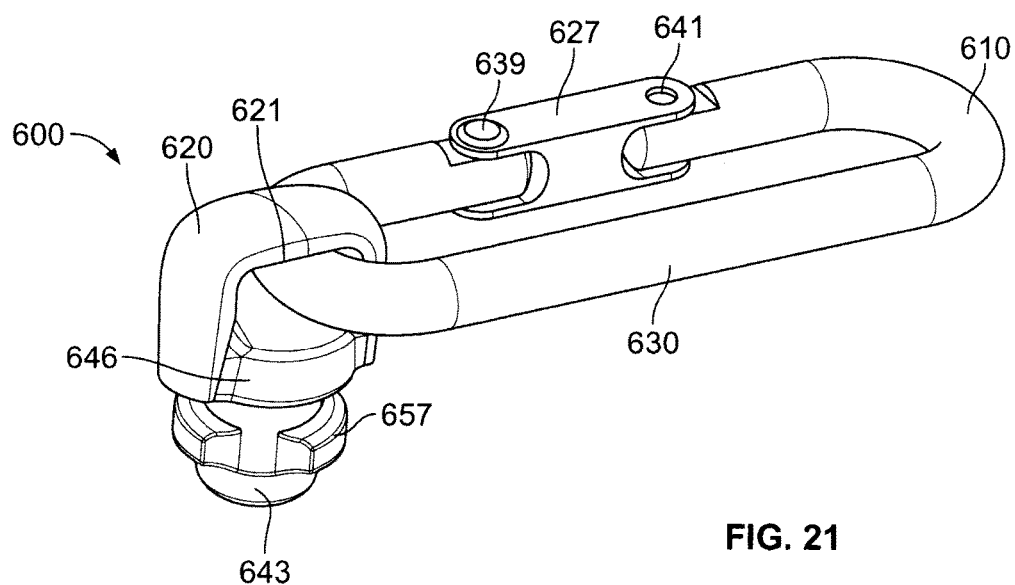
FIG. 21 is a perspective view of the removable securing chain attachment assembly of FIG. 13.

The insert body 144 may be of any appropriate shape or size, such as being shaped for insertion into the receiver 172, a non-limiting example of which is shown in FIGS. 2, 6-7. Although illustrated as substantially cylindrical in shape, it is to be understood that the insert body 144 may be shaped to accommodate any type, shape and sized receiver 172. The receiver 172 may include an inner portion (not shown) that may be of any appropriate shape or size, such as a curved or rounded shape, by way of a non-limiting example.

The insert body 144 may include a cavity 182. The cavity 182 may be positioned at any appropriate location within the insert body 144. The cavity 182 may be of any appropriate shape or size. The insert body 144 may include apertures 185. The apertures 185 may be located through the insert body 144. The apertures 185 may be of any appropriate shape or size, such as a cylindrical shape, by way of a non-limiting example. The apertures 185 may also be positioned at any appropriate location on the insert body 144.

The insert body 144 may include a plunger 189. The plunger 189 may be located within the cavity 182 of the insert body 144. The plunger 189 may be of any appropriate shape or size. The insert body 144 may also include an elongated member 191. The elongated member 191 may be of any appropriate shape or size, such as a generally cylindrical shape, by way of a non-limiting example. The elongated member 191 may include a first end 192 and a second end 193. The first end 192 may be connected to the plunger 189 in any appropriate manner.

The removable securing chain attachment assembly 100 may include a cam lever 195. The cam lever 195 may be provided to allow a user to selectively adjust the removable securing chain attachment assembly 100 between locked and unlocked positions. The cam lever 195 may include a handle portion 197 and a camming body 199 laterally disposed from the handle portion 197. The handle portion 197 may be shaped and sized to assist a user with gripping such. The camming surface 199 may be of any appropriate shape, such as by way of a non-limiting example, being a generally cylindrical shape. The cam lever 195 may engage the second end 193 of the elongated member 191. The cam lever 195 may further include a washer member 200. The washer member 200 may be of any appropriate shape and size and is not limited to that shown. The camming surface 199 may rotate on the washer member 200 when moving to and from the locked position and the unlocked position.

The cavity 182 may allow the elongated member 191 and the plunger 189 to be selectively engaged with one or more locking members 203, such as a ball bearing, by way of a non-limiting example, between a locked position and a released or unlocked position. In the locked position the plunger 189 may engage the locking members 203 to push the locking members 203 outwardly beyond the insert body 144 via the apertures 185. The locking members 203 may engage, for example, the receiver 172 to generally prevent the removable change attachment assembly 100 from being removed from the receiver 172. Such a configuration may ensure that the removable change attachment assembly 100 may remain in the locked position to generally prevent disconnection from the receiver 172 while towing.

Further, the locking members 203 may be shaped such that the insert body 144 may be capable of rotating while being locked within the receiver 172. The rotation of the insert body 144 may permit the entire removable securing chain attachment assembly 100 to rotate in the receiver 172 when locked therein. By way of a non-limiting example, the removable securing chain attachment assembly 100 may be capable of rotating approximately 360 degrees, but may rotate any amount. This may permit the removable securing chain attachment assembly 100 to rotate to be positioned in a preselected location in the load bed 74 of the towing vehicle 76. Further, when the removable securing chain attachment assembly 100 is in the locked position with a chain attached thereto, the removable securing chain attachment assembly 100 may rotate to generally prevent excessive forces from being applied to the removable securing chain attachment assembly 100 during operation.

Similarly, the pivoting of the removable securing chain attachment assembly 100 may further permit the appropriate positioning of the removable securing chain attachment assembly 100 when assembling. The user may upon insertion of the removable securing chain attachment assembly 100

In the released or unlocked position, as shown in FIGS. 6-7, the camming surface 199 may be positioned so that the plunger 189 may disengage from the locking members 203. This may result in the locking members 203 to be selectively positioned within the apertures 185 such that the locking members 203 may disengage from the receiver 172 and return toward the center of the insert body 144.

As indicated above, the removable securing chain attachment assembly 100 may be removed from or placed in the receiver 172 in a manner that may not require disconnection from the side or underneath of the towing vehicle 76. After insertion into the receiver 172, the cam lever 195 may be actuated or otherwise pivoted toward a locked position. The actuation of the cam lever 195 may cause the cam surface 199 to engage the second end 193 of the elongated member 191. This may then selectively position the plunger 189 toward the locking members 203 such that the locking members 203 may generally extend from the apertures 185. This then may place the removable securing chain attachment assembly 100 in the locked position. As previously noted, in this locked position, the removable securing chain attachment assembly 100 may be capable of rotating and pivoting relative to the receiver 172.

Additional embodiments of a removable securing chain attachment assembly according the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired removable securing chain attachment assembly without departing from the spirit and scope of the present invention.

In other embodiments, examples of which are shown in FIGS. 8-12, a removable securing chain attachment assembly 400 may include a chain attachment arm 410 and a receiver attachment body 420. The chain attachment arm 410 may be pivotally attached to the receiver attachment body 420 in any appropriate manner. In some embodiments, the chain attachment arm 410 may be pivotally attached to the receiver attachment body 420 at a pivot point 424 such that the chain attachment arm 410 may generally pivot relative to the receiver attachment body 420 at the pivot 424.

The chain attachment arm 410 may be of any appropriate shape and size, such as by way of a non-limiting example, being of a generally elongated shape. The chain attachment arm 410 may include a chain attaching portion 430. The chain attaching portion 430 may be of any appropriate shape and size such that the securing chain (not shown) may be selectively attached to the chain attaching portion 430. In some embodiments, the chain attaching portion 430 may be a generally closed loop of any appropriate shape. Further, the chain attaching portion 430 may have a generally open loop or slot, but that is otherwise shaped to selectively attach thereto the securing chain (not shown). The chain attachment arm 410 may include a pair of arms 434 that extend from the chain attaching portion 430. The arms 434 may extend a predetermined distance from one another as they extend toward the chain attaching portion 430. The arms 434 may be integrally formed as a monolithic unit with the chain attaching portion 430 or may be attached thereto through a subsequent operation. Further, each of the arms 434 may include apertures 440. The apertures 440 may be of any appropriate shape and size. The apertures 440 of each arm 434 may be generally aligned with one another.

The receiver attachment body 420 may include an insert body (not shown) of any appropriate configuration. The receiver attachment body 420 may also include a load bed engaging portion 446 attached with the insert body 444 in any appropriate manner, such as being formed as a monolithic unit, welding, fastening, or the like. A generally cylindrical sleeve 448 may be attached to at least one of the load bed engaging portion 446 and the insert body. However, in some embodiments, the receiver attachment body 420 may not include the load bed engaging portion 446. The sleeve 448 may be attached to the at least one of the load bed engaging portion 446 and the insert body in any appropriate manner. In some embodiments, the sleeve 448 may be fastened, welded, adhered using adhesives, integrally formed with the load bed engaging portion 446, or the like. The sleeve 448 may be fastened, welded, adhered using adhesives, integrally formed with the insert body, or the like. The sleeve 448 may be of a length L that it generally fits between the arms 434 of the chain attachment arm 410, which may form a portion of the pivot 424. The pivot 424 may include a pin 454 inserted through the apertures 440 of the arms 434 and through the hollow portion of the sleeve 448. The pin 454 may permit the chain attachment arm 410 to pivot relative to the receiver attachment body 420.

The receiver attachment body 420 may be capable of being selectively attached to an under bed gooseneck hitch mounting system 170 as further described above. The removable securing chain attachment assembly 400 may include a cam lever 495. The cam lever 495 may be provided to allow a user to selectively adjust the removable securing chain attachment assembly 400 between the locked and unlocked positions. The cam lever 495 may include a handle portion 497 and a camming body 499 laterally disposed from the handle portion 497. The handle portion 497 may be shaped and sized to assist a user with gripping such. The camming surface 499 may be of any appropriate shape, such as by way of a non-limiting example, being a generally cylindrical shape. The cam lever 495 may engage a locking mechanism (not shown) as further described above.

The removable securing chain attachment assembly 400 may be capable of rotating when locked within the receiver 172. In some embodiments, the removable securing chain attachment assembly 400 may be capable of rotating approximately 360 degrees when locked within the receiver 172. Further, the removable securing chain attachment assembly 400 may be capable of pivoting along pivot 424. The rotating and pivoting of the removable securing chain attachment assembly 400 may permit the removable securing chain attachment assembly 400 to be selectively or automatically positioned in the appropriate position. This may generally reduce the amount of force that may otherwise be applied to the removable securing chain attachment assembly 400 during operation thereof.

Other embodiments of a removable securing chain attachment assembly 600 are shown in FIGS. 13-21. In these embodiments, the removable securing chain attachment assembly 600 may include a chain attachment arm 610 and a receiver attachment body 620. The chain attachment arm 610 may be pivotally attached to the receiver attachment body 620 in any appropriate manner. By way of a non-limiting example, the chain attachment arm 610 may be pivotally attached to a generally closed loop 621 of the receiver attachment body 620.

The chain attachment arm 610 may be of any appropriate shape and size, such as by way of a non-limiting example, being of a generally elongated oval shape. The chain attachment arm 610 may include a chain attaching portion 630. The chain attaching portion 630 may be of any appropriate shape and size such that the securing chain (not shown) may be selectively attached to the chain attaching portion 630. The chain attaching portion 630 may be a generally closed loop of any appropriate shape. Further, the chain attaching portion 630 may have a generally open loop, hook or slot shaped to have selectively attached thereto the securing chain (not shown).

The chain attaching portion 630 may include a selectively openable arm or gate 637. The gate 637 may of any appropriate shape or size such that it is capable of being selectively opened to attach the securing chain chain to the chain attaching portion 630 and selectively closeable to lock the securing chain to the chain attaching portion 630. Opening the gate or arm 637 may permit the chain attaching portion 630 to be selectively removed from or attached to the closed loop 621. Any appropriate gate or arm 637 may be used. The present teachings are not limited to the gate or arm 637 shown. By way of a non-limiting example, the gate 637 may include a first pivot member 639 that may permit the gate 637 to pivot with respect to the chain attaching portion 630. Any appropriate pivoting member may be used without departing from the present teachings. The gate 637 may include a locking member 641 that may pivot with respect to the pivot member 639 to open the chain attaching portion 630 and may when engaged with the chain attaching portion 630 generally securely remain in place. Any appropriate configuration may be used without departing from the present teachings.

The receiver attachment body 620 may include a post 643 and a load bed engaging portion 646. The receiver attachment body 620 may be capable of being selectively attached to an under bed gooseneck hitch mounting system 170 as further described above or as otherwise is appropriate. The post 643 may be of any appropriate shape or size, such as a cylindrical, ovalar, triangular or rectangular. By way of a non-limiting example and as shown in FIGS. 16-21, the post 643 may include a generally T-shape engaging member 657, but is not limited to the shape shown. The post 643 may also be curved into a generally hooked shape engaging member as it extends away from the load bed engaging portion 646.

In use, for example, a consumer may place receiver attachment body 620 on top of the receiver 172, so that the post 634 may drop into the corresponding aperture receiver 172. Once the post 634 is placed within the receiver 172, the consumer may rotate the receiver attachment body 620 any appropriate amount, such as by way of a non-limiting example, ninety degrees, either clockwise or counterclockwise, into a lock position. The engaging member 657 may engage a portion of the receiver 172 securing the removably securing chain attachment assembly 600 to the receiver 172. To remove the removably securing chain attachment assembly 600, a user may rotate the receiver attachment body 620 in a direction generally opposite to that described above. The engaging member 657 may release from the receiver 172 and the removably securing chain attachment assembly 600 may be removed from the receiver 172.

When the components of the removable securing chain attachment assembly 600 have been rotated into the correct position, the post 634 will drop into place. A locking component (not shown) may prevent the removable securing chain attachment assembly 600 from coming out of the receiver 172 during use.

The removable securing chain attachment assembly 600 may be capable of rotating when locked within the receiver 172. The removable securing chain attachment assembly 600 may be capable of rotating approximately 360 degrees when locked within the receiver 172. By way of a non-limiting example, the chain attaching portion 630 may rotate relative to the load bed engaging portion 646. Further, the removable securing chain attachment assembly 600 may be capable of pivoting. More specifically, the chain attaching portion 630 may be capable of pivoting when selectively attached to the closed loop 621. The rotating and pivoting of the removable securing chain attachment assembly 600 may permit the removable securing chain attachment assembly 600 to be selectively or automatically positioned in the appropriate position. This may generally reduce the amount of force that may otherwise be applied to the removable securing chain attachment assembly 600 during operation thereof Further, the load bed engaging portion 646 may include an anti-rotation member (not shown) that may generally prevent the load bed engaging portion 646 from rotating. The chain attaching portion 630, however, may still rotate relative to the load bed engaging portion 646. By way of a non-limiting example, the anti-rotation member may include a pair of ears that extend down from 646 to engage 172 preventing the load bed engaging portion 646 from rotating. The ears may engage any appropriate portion of the removably securing chain attachment assembly 646, the receiver 172 or the load bed 76. The ears may be attached with the load bed engaging portion 646. The ears may be capable of selective positioning in a non-engaging position upon engagement of the removable securing chain attachment assembly 600 with the receiver 172. The ears may be capable of further selective positioning in an engaging position when the removable securing chain attachment assembly 600 is engaged with the receiver 172. By way of a non-limiting example, the ears may be positioned upward when engaging the removable securing chain attachment assembly 600 and down after engagement of the removable securing chain attachment assembly. The chain attachment arm 610 or any portion thereof may generally prevent the ears from moving to the non-engaged position, e.g., move upward. The anti-rotation member may generally prevent heavily loaded side loads from applying to the removably securing chain attachment assembly 600 during operation Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A securing member comprising:
   a securing body capable of securing an accessory;
   an insert body extending from the securing body and capable of being inserted into a receiver of an under bed hitch mounting device;
   a locking member positioned in the insert body;

a camming mechanism extending above the insert body, the camming mechanism in operative communication with the locking member, wherein actuation of the camming mechanism positions the locking member from an unlocked position to a locked position.

2. The securing member of claim 1, wherein the insert body comprises an elongated body laterally extending within the insert body and a plunger extending from the elongated body, the plunger in operative communication with the locking member.

3. The securing member of claim 2, wherein the camming mechanism comprises:
   a cam lever; and
   a camming surface engaged with the elongated body to laterally position the elongated body.

4. The securing member of claim 3, wherein laterally positioning the elongated body positions the locking member from the unlocked position to the locked position.

5. The securing member of claim 1, wherein the locking member is capable of preventing withdrawal of the insert body from the receiver.

6. A system comprising:
   an under bed hitch mounting system attachable to a vehicle below a load bed of the vehicle, the under bed hitch mounting system including a receiver;
   a securing body capable of securing an accessory;
   an insert body extending from the securing body, the insert body selectively insertable into the receiver of the under bed hitch mounting device;
   a locking member positioned in the insert body;
   a camming mechanism extending above the insert body, the camming mechanism in operative communication with the locking member, wherein actuation of the camming mechanism positions the locking member from an unlocked position to a locked position preventing withdrawal of the insert body from the receiver.

7. The system of claim 6, wherein the insert body comprises an elongated body laterally extending within the insert body and a plunger extending from the elongated body, the plunger in operative communication with the locking member.

8. The system of claim 7, wherein the camming mechanism comprises:
   a cam lever; and
   a camming surface engaged with the elongated body to laterally position the elongated body.

9. The system of claim 8, wherein the cam lever selectively positions the locking member from the locked and unlocked positions.

10. A securing member comprising:
    a securing body capable of securing an accessory;
    an insert body extending from the securing body and capable of being inserted into a receiver of an under bed hitch mounting device;
    a locking member positioned in the insert body;
    a camming mechanism extending above the insert body, the camming mechanism in operative communication with the locking member, wherein actuation of the camming mechanism positions a portion of the locking member in a direction parallel with the insert body from an unlocked position to a locked position.

11. The securing member of claim 10, wherein the locking member comprises a plunger in operative communication with the caroming mechanism.

12. The securing member of claim 11, wherein the locking member comprises a pair of balls retractable within and extendable outside of the insert body.

13. The securing member of claim 12, wherein the caroming mechanism laterally displaces the plunger to retract the pair of balls within and extend the pair of balls outside of the insert body.

* * * * *